(12) United States Patent
Nelms et al.

(10) Patent No.: US 10,368,188 B2
(45) Date of Patent: Jul. 30, 2019

(54) SYSTEMS AND METHODS FOR IDENTIFYING LOCATION-BASED SERVICES

(71) Applicant: Walmart Apollo, LLC, Bentonville, AR (US)

(72) Inventors: David Martin Nelms, Rogers, AR (US); Bradley Joseph Kieffer, Rogers, AR (US); Eytan Daniyalzade, San Francisco, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 5 days.

(21) Appl. No.: 15/834,747

(22) Filed: Dec. 7, 2017

(65) Prior Publication Data

US 2018/0167768 A1     Jun. 14, 2018

Related U.S. Application Data

(60) Provisional application No. 62/432,267, filed on Dec. 9, 2016.

(51) Int. Cl.
*H04W 4/02* (2018.01)
*H04L 29/08* (2006.01)
(Continued)

(52) U.S. Cl.
CPC ............... *H04W 4/02* (2013.01); *G06F 7/06* (2013.01); *G06F 15/16* (2013.01); *G06F 15/177* (2013.01);
(Continued)

(58) Field of Classification Search
CPC ..... H04W 4/02; G06K 7/1413; G06K 7/1417; G06K 19/06037; G06K 19/06028;
(Continued)

(56) References Cited

U.S. PATENT DOCUMENTS

| 2002/0138345 A1* | 9/2002 | Dickson | G06Q 30/02 705/14.36 |
| 2004/0104930 A1* | 6/2004 | Stoler | G06Q 30/02 715/738 |

(Continued)

FOREIGN PATENT DOCUMENTS

| WO | 2014/123495 A1 | 8/2014 | |
| WO | WO 2014123495 A1 * | 8/2014 | ......... G06Q 30/0601 |

OTHER PUBLICATIONS

International Search Report and Written Opinion for PCT/US2017065115 dated Feb. 9, 2018, pp. 1-14.

*Primary Examiner* — Michael Y Mapa
(74) *Attorney, Agent, or Firm* — McCarter & English, LLP; David R. Burns

(57) ABSTRACT

Methods and systems to perform location-based services using a mobile application on a mobile computing device are discussed. A user uses the mobile computing device to scan a machine-readable element. The mobile application is configured to decode the machine-readable element to identify available types of services that are supported in a location of the machine-readable element. A services management framework determines available ordered services in the location-based on the available types of services.

19 Claims, 4 Drawing Sheets

(51) Int. Cl.
*G06Q 30/06* (2012.01)
*G06Q 20/18* (2012.01)
*G06Q 20/20* (2012.01)
*G06K 19/06* (2006.01)
*G06F 16/27* (2019.01)
*G06F 7/06* (2006.01)
*G06F 15/16* (2006.01)
*G06F 15/177* (2006.01)
*G06Q 30/02* (2012.01)
*G06F 16/00* (2019.01)

(52) U.S. Cl.
CPC .............. *G06F 16/00* (2019.01); *G06F 16/27* (2019.01); *G06Q 30/0241* (2013.01); *G06Q 30/06* (2013.01); *G06Q 30/0633* (2013.01); *H04L 67/16* (2013.01); *G06K 19/06028* (2013.01); *G06K 19/06037* (2013.01); *G06Q 20/18* (2013.01); *G06Q 20/20* (2013.01)

(58) Field of Classification Search
CPC .............. G06Q 20/0453; G06Q 20/02; G06Q 30/0241; G06Q 30/06; G06Q 30/0633; G06Q 20/18; G06Q 20/20; G06F 16/00; G06F 16/27; G06F 7/06; G06F 15/177; G06F 15/16; H04L 67/16

USPC ...................... 455/414.1–414.2, 456.1–456.3
See application file for complete search history.

(56) References Cited

U.S. PATENT DOCUMENTS

| | | |
|---|---|---|
| 2009/0015379 A1 | 1/2009 | Rosenberg |
| 2010/0262554 A1* | 10/2010 | Elliott .................... G01C 21/20 705/323 |
| 2013/0181045 A1* | 7/2013 | Dessert ................ G06Q 20/322 235/383 |
| 2014/0188601 A1* | 7/2014 | Buset ................ G06Q 30/0633 705/14.49 |
| 2014/0239057 A1 | 8/2014 | Galvin, Jr. et al. |
| 2014/0304169 A1 | 10/2014 | Kobres |
| 2015/0079942 A1* | 3/2015 | Kostka .................... H04W 4/21 455/411 |
| 2015/0095234 A1 | 4/2015 | Wong |
| 2016/0125505 A1* | 5/2016 | Goulart .............. G06Q 30/0633 705/26.8 |
| 2017/0316296 A1* | 11/2017 | Ashiura ........... G06K 19/06075 |

* cited by examiner

SYSTEMS AND METHODS FOR IDENTIFYING LOCATION-BASED SERVICES

CROSS-REFERENCE TO RELATED PATENT APPLICATIONS

This application claims priority to and benefit of U.S. Provisional Patent Application No. 62/432,267, filed Dec. 9, 2016, the disclosure of which is incorporated herein by reference in its entirety.

BACKGROUND

Mobile applications executing on a mobile computing device such as a smartphone may make use of the mobile computing device's ability to scan machine-readable elements to obtain information on its environment. For example, a mobile application may decode a machine-readable element to receive information that can be utilized by the mobile application.

BRIEF SUMMARY

In one embodiment, a system for identifying available location-based services is provided. The system includes a mobile application executable on a mobile computing device operated by a user. The system further includes a database storing one or more ordered services associated with the user. The system also includes a machine-readable element generator configured to generate and display a machine-readable element that identifies types of services available to be performed at a location of the machine-readable element. The system further includes a server communicatively coupled to the database and the mobile application and hosting a services management framework configured to map the one or more ordered services to the one or more available types of services to determine one or more available ordered services at the location of the machine-readable element. The mobile application is configured to scan the machine-readable element and decode the machine-readable element. The mobile application is also configured to identify the one or more available types of services based on the decoded machine-readable element and transmit, to the services management framework, the one or more available types of services. The mobile application is further configured to receive, from the services management framework, the one or more available ordered services, and receive a user selection to initiate performance of at least one available ordered service of the one or more available ordered services.

In another embodiment, a method for identifying available location-based services is provided. The method includes storing, in a database, one or more ordered services associated with a user. The method also includes generating, via a machine-readable element generator, a machine-readable element that identifies types of services available to be performed at a location of the machine-readable element. The method further includes displaying, via a machine-readable element generator, the machine-readable element at a predefined location. The method also includes scanning and decoding, via a mobile application executable on a mobile computing device operated by the user, the machine-readable element. The method also includes identifying, via the mobile application, the one or more available types of services based on the decoded machine-readable element and transmitting, via the mobile application, the one or more available types of services to a server communicatively coupled to the database and the mobile application and hosting a services management framework. The method additionally includes mapping, via the services management framework, the one or more ordered services to the one or more available types of services to determine one or more available ordered services at the location of the machine-readable element, and transmitting the one or more available ordered services to the mobile application. The method also includes receiving, with the mobile application, a user selection to initiate performance of at least one available ordered service of the one or more available ordered services.

BRIEF DESCRIPTION OF DRAWINGS

To assist those of skill in the art in making and using a location-based identification system and associated methods, reference is made to the accompanying figures. The accompanying figures, which are incorporated in and constitute a part of this specification, illustrate one or more embodiments of the invention and, together with the description, help to explain the invention. Illustrative embodiments are shown by way of example in the accompanying drawings and should not be considered as limiting. In the figures.

DETAILED DESCRIPTION

Figure 1:
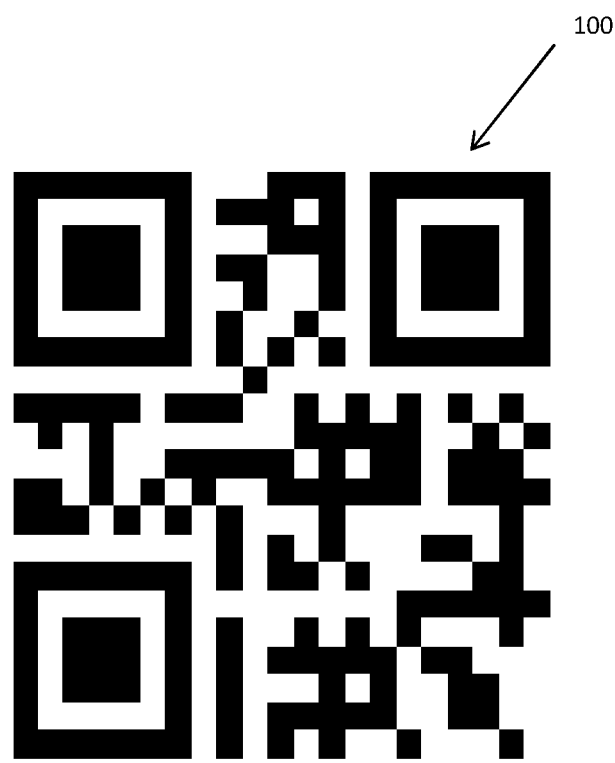
FIG. 1 is a block diagram of an exemplary machine-readable element, in accordance with an exemplary embodiment.

Described in detail herein are methods and systems for identifying available location-based services using a location-based identification system. In one embodiment, the location-based identification system may be employed in a physical facility. The system includes a specialized mobile application associated with a mobile computing device, such as a smartphone. The mobile application may include authentication information for a user, such as a user name or a user identification (ID) and a password. The system also includes a machine-readable element (MRE) generator configured to generate and display a machine-readable element that identifies types of services available to be performed at a location of the displayed machine-readable element. In an exemplary embodiment, the machine-readable element is located at or within close proximity to a local computing device. A user uses the mobile computing device to scan the machine-readable element. The machine-readable element is configured to provide the mobile application with location identification information, such as identifying the local computing device associated with the machine-readable element. The machine-readable element is further configured to provide the available types of services that are supported in the location of the machine-readable element. "Available types of services" are location-based computerized services that can be performed at the location of the machine-readable element using the mobile application.

Non-limiting examples of types of services include purchasing goods and services, processing a pharmacy order, financial services such as transferring or receiving money to/from a third party, receiving an e-receipt from a purchase, and returning an item from the e-receipt.

The system further includes a server hosting a services management framework communicatively coupled with a database and the mobile application. The database includes one or more services previously ordered by the user (hereafter referred to as "ordered services"). Ordered services are computerized services that the user would like performed in connection with their trip to a physical facility.

The mobile application transmits the available types of services identified from the machine-readable element to the services management framework. The services management framework is configured to map the one or more ordered services to the available types of services to determine one or more available ordered services in the location of the machine-readable element. "Available ordered services" are ordered services that are able be performed at the location of displayed machine-readable element (e.g. such as at the local computing device associated with the machine-readable element).

Following the mapping, the services management framework transmits the one or more available ordered services to the mobile application. In an exemplary embodiment, the mobile application displays the one or more available ordered services to the user. The user selects at least one available ordered service from the one or more available ordered services that the user wants performed. The mobile application then communicates the selected available ordered services to the local computing device at the location of the machine-readable element to initiate performance of the selected available ordered services.

A non-limiting example of the location-based identification system includes a user at a physical facility such as a retail store using the specialized mobile application on a mobile computing device, such as a smartphone. The user previously has ordered services whether through the mobile application or online that are not complete as they require some user interaction with the facility (i.e. picking up purchases, money, returning an item, etc.). Exemplary services include without limitation purchases of goods, pharmacy orders, transferring or receiving money to/from a third party and the return of items referenced by electronic receipts. Records of these orders are saved in a database and associated with the user. At the facility, the user may approach a local computing device such as a POS terminal in a register that includes a display for displaying a machine-readable element. The machine-readable element includes location identification information and types of services available to the mobile application at the location of the machine-readable element. The display is in communication with an MRE generator configured to generate and display the machine-readable element. It will be appreciated that the MRE generator may be integrated into the local computing device and the display may be a display of the local computing device. The user uses the mobile computing device to scan the machine-readable element. The mobile application identifies the types of services available in that location from the scanned information. The mobile application transmits the available types of services to a services management framework being executed on a server. The services management framework maps the available types of services to the ordered services associated with the user to determine which ordered services for the user are available at the particular location. In other words, these are the available types of services relevant for the user's current trip. The services management framework communicates the available ordered services to the mobile application. In one embodiment, one or more of the available ordered services may be automatically processed using the mobile application. For example, if pharmacy services are available at the location an associate may be automatically notified to pick up a previously filled prescription for delivery to the user. Alternatively, the mobile application may adjust its displayed information regarding services based on the transmission from the services management framework and query the user as to which available ordered services the user wishes to have performed. As part of the available ordered services being processed, the mobile application may transmit authentication data identifying the user, directly or indirectly, to a remote computer system.

The location-based identification system may improve customer service by minimizing an individual's wait time to receive services, while also improving the ease and accuracy of performing multiple services by scanning a machine-readable element using a mobile computing device. The location-based identification system may further improve the efficiency of the computing environment by reducing network traffic by automating the authentication, payment and selection of services at a location.

FIG. 1 is a block diagram of an exemplary machine-readable element 100. In one exemplary embodiment, machine-readable element 100 is a QR code or a bar code (not shown). Machine-readable element 100 includes one or more encoded identifiers identifying a location of a POS terminal (shown in FIG. 2) associated with machine-readable element 100. For example, machine-readable element 100 may be displayed at a local computing device associated with the machine-readable element 100. Machine-readable element also includes data indicating what services are available through the associated local computing device.

A scanner or reader (not shown) can scan and/or decode the identifiers from machine-readable element 100. In an exemplary embodiment, a camera associated with a mobile computing device (shown in FIG. 2) is used to scan machine-readable element 100. A mobile application (shown in FIG. 2) then decodes the identifier(s) in machine-readable element 100. In one exemplary embodiment, an identifier is alpha-numeric characters.

Figure 2:
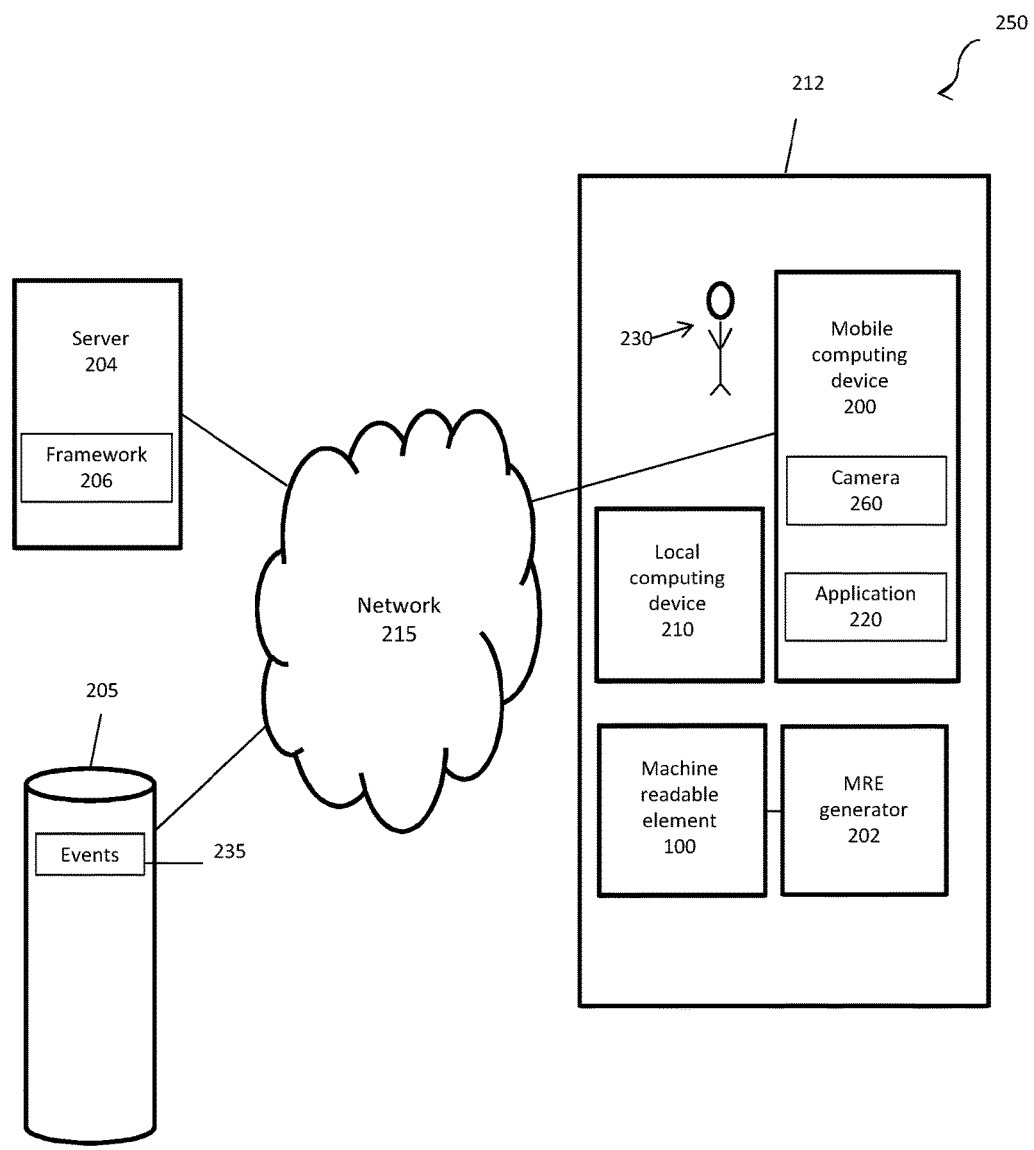
FIG. 2 illustrates an exemplary network environment suitable for a location-based identification system, in accordance with an exemplary embodiment.

FIG. 2 illustrates an exemplary network environment suitable for a location-based identification system 250, in accordance with an exemplary embodiment. Location-based identification system 250 includes one or more databases 205 (only one shown in FIG. 2), one or more mobile computing devices 200 (only one shown in FIG. 2), one or more MRE generators 202 (only one shown in FIG. 2), one or more machine-readable elements 100 (only one shown in FIG. 2), and one or more servers 204 (only one shown in FIG. 2) hosting a services management framework 206. Mobile computing device 200 includes a mobile application 220 configured to communicate with server 204, and particularly services management framework 206, via a communications network 215. In an exemplary embodiment, one or more portions of communications network 215 is an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks. Mobile computing devices 200 may also include a camera 260 used to scan machine-readable element 100. Mobile application 220 may further include instructions associated with decoding identifiers encoded in machine-readable element 100.

As a non-limiting example, location-based identification system 250 is associated with a physical facility 212. In an exemplary embodiment, user 230, mobile computing device 200, at least one local computing device 210 such as a POS terminal, and at least one machine-readable element 100 are located within physical facility 212. In an exemplary embodiment, machine-readable element 100 is located at or in close proximity to local computing device 210. MRE generator 202 may be located within physical facility 212 or at a remote location (not shown). A location of user 230 using mobile computing device 200 is determined by scanning machine-readable element 100, as described below.

MRE generator 202 generates a specific machine-readable element 100 dependent on types of services available at a location. For example, processing a pharmacy order and making a payment using a store payment option are ordered services for user 230. User 230 then scans machine-readable element 100 at a pharmacy counter location. Machine-readable element 100 identifies to mobile application 220 that, for example, processing pharmacy orders and making payments using store payment options are supported in the location. As a result, these two available services would be shown to user 230 (assuming the user had previously ordered services of those types) after scanning machine-readable element 100. User 230 could then select to proceed with one or both services.

In one embodiment, machine-readable element 100 is dynamic and capable of being changed after machine-readable element 100 is created. In such an embodiment, MRE generator 202 generates a different machine-readable element 100 for each transaction. A transaction occurs after user 230 scans machine-readable element 100 to execute one or more available ordered services. Machine-readable element 100 may appear different after each transaction, but may still contain the same content. For example, if machine-readable element 100 is a QR code, the QR code may have a new pattern of modules for each transaction, but may contain the same types of available services and same location information. This may be accomplished by, for example, MRE generator 202 using a different error correction level resulting in a different image that contains the same information. Machine-readable element's 100 dynamic properties enables types of available services and location information to be changed as required by the system without machine-readable element 100 having to be physically replaced with a new image every time information changes. Machine-readable element 100 being dynamic also increases security by preventing unauthorized persons from changing or manipulating machine-readable element 100 to re-direct a user to an unintended destination.

User 230 uses mobile computing device 200 to scan machine-readable element 100 to identify one or more types of services available at the location. In an exemplary embodiments, machine-readable element 100 is associated with local computing device 210 disposed in physical facility 212. For example, machine-readable element 100 is located on or in close proximity to local computing device 210. Machine-readable element 100 includes encoded identifiers. Mobile application 220 decodes the identifiers in response to mobile computing device 200 scanning machine-readable element 100.

Upon decoding the identifiers in machine-readable element 100, mobile application 220 transmits data to services management framework 206. The data may include, but is not limited to, the types of services available in a location identified by scanning machine-readable element 100 and a user identification (ID) for user 230. In an exemplary embodiments, services management framework 206 is further in communication with database 205. Database 205 includes one or more ordered services 235 associated with user 230. Each ordered service 235 is previously requested by user 230 (or on user's behalf) using a computing device and is associated with the user ID for user 230. In some embodiments, user 230 creates the one or more ordered services 235 using mobile application 220.

Services management framework 206 is configured to retrieve from database 205 the one or more ordered services 235 for user 230 using the user ID. Services management framework 206 is further configured to map the one or more ordered services to the available types of services to determine one or more available ordered services at the location of the user (i.e. the location where the machine-readable element 100 was scanned). Services management framework 206 transmits the determined one or more available ordered services to mobile application 220. In an exemplary embodiment, mobile application 220 then displays the one or more available ordered services to user 230. User 230 selects from mobile application 220 at least one available ordered service from the one or more available ordered services that user 230 wants performed. Upon making a selection, mobile application 220 communicates with server 204 and local computing device 210 to performing the selected available ordered services. For example, mobile application 220 may transmit authentication information (i.e. customer identity) and location identification information directly or indirectly through local computing device 210 to server 204 to trigger performance of the previously ordered services available at the particular location. Server 204 may also communicate with local computing device 210 to execute and complete the selected available ordered services.

Database 205 is connected to communications network 215 via a wired or wireless connection. Mobile computing device 200 includes one or more processors configured to communicate with code transmission computing device 202 via network 217 and services management framework 206 via network 215. Mobile computing device 200 hosts mobile application 220 configured to interact with one or more components of services management framework 206 and/or local computing device 210. Database 205 stores information and data related to ordered services as described herein. For example, database 205 includes ordered services 235 associated with user 230. Database 205 can be located at one or more geographically distributed locations from other databases 205 or from services management framework 206. Alternatively, database 205 can be included within services management framework 206.

In response to scanning machine-readable element 100, the location-based identification system can process multiple transactions and services at local computing device 210. Mobile application 220 may initiate the multiple transactions and services without the need to interface with multiple computing systems, thus improving the efficiency of the computing environment. By avoiding the need to use multiple computer systems, the location-based identification system reduces network communication and increases the response speed of both the network and the available services (i.e., types of services) provided by a merchant.

Reducing or eliminating transaction time improves the efficiency of the computing environment by reducing network traffic and increasing the response speed of the network.

Figure 3:
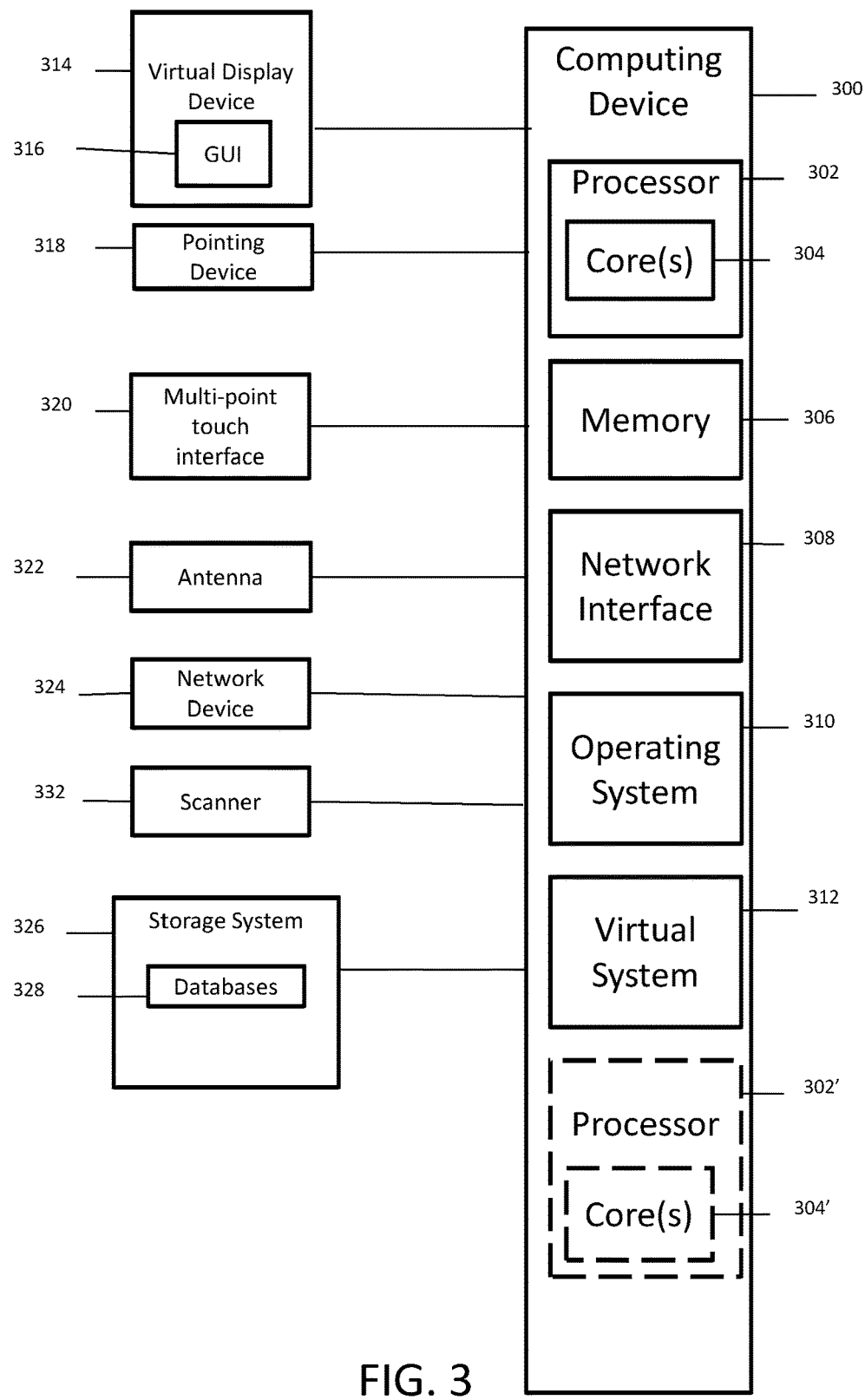
FIG. 3 illustrates an exemplary computing system, in accordance with an exemplary embodiment.

FIG. 3 is a block diagram of an example computing device 300 for implementing an exemplary embodiment. Computing device 300 may be a mobile computing device (e.g. mobile computing device 200 as shown in FIG. 2), a MRE generator (e.g. MRE generator 202 shown in FIG. 2), and/or an server (e.g. server 204 shown in FIG. 2). Computing device 300 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in computing device 300 may store computer-readable and computer-executable instructions or software (e.g., mobile application 220) for implementing exemplary operations of computing device 300. Computing device 300 also includes configurable and/or programmable processor 302 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in memory 306 and other programs for implementing exemplary embodiments of the present disclosure. Processor 302 and processor(s) 302' may each be a single core processor or multiple core (304 and 304') processor. Either or both of processor 302 and processor(s) 302' may be configured to execute one or more of the instructions described in connection with computing device 300.

In some embodiments, virtualization may be employed in computing device 300 so that infrastructure and resources in computing device 300 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with computing device 300 through a visual display device 314, such as a computer monitor or a touch screen display, which may display one or more graphical user interfaces 316, multi touch interface 320, a scanner 332, and a pointing device 318.

Computing device 300 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 may include one or more databases 328 for storing instructions. Databases 328 may be updated manually or automatically at any suitable time to add, delete, and/or update one or more data items in the databases. Databases 328 includes information such as ordered services database 235. Ordered services database 235 stores information associated with ordered services created by one or more users (e.g. user 230 shown in FIG. 2).

Computing device 300 includes a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the location-based identification system may include one or more antennas 322 to facilitate wireless communication (e.g., via the network interface) between computing device 300 and a network and/or between computing device 300 and other computing devices. Network interface 308 may include a built-in network adapter, network interface card, PCMCIA network card, card bus network adapter, wireless network adapter, USB network adapter, modem or any other device suitable for interfacing computing device 300 to any type of network capable of communication and performing the operations described herein.

Computing device 300 may run operating system 310, such as versions of the Microsoft® Windows® operating systems, different releases of the Unix and Linux operating systems, versions of the MacOS® for Macintosh computers, embedded operating systems, real-time operating systems, open source operating systems, proprietary operating systems, or other operating systems capable of running on computing device 300 and performing the operations described herein. In exemplary embodiments, operating system 310 may be run in native mode or emulated mode. In an exemplary embodiment, operating system 310 may be run on one or more cloud machine instances.

Figure 4:
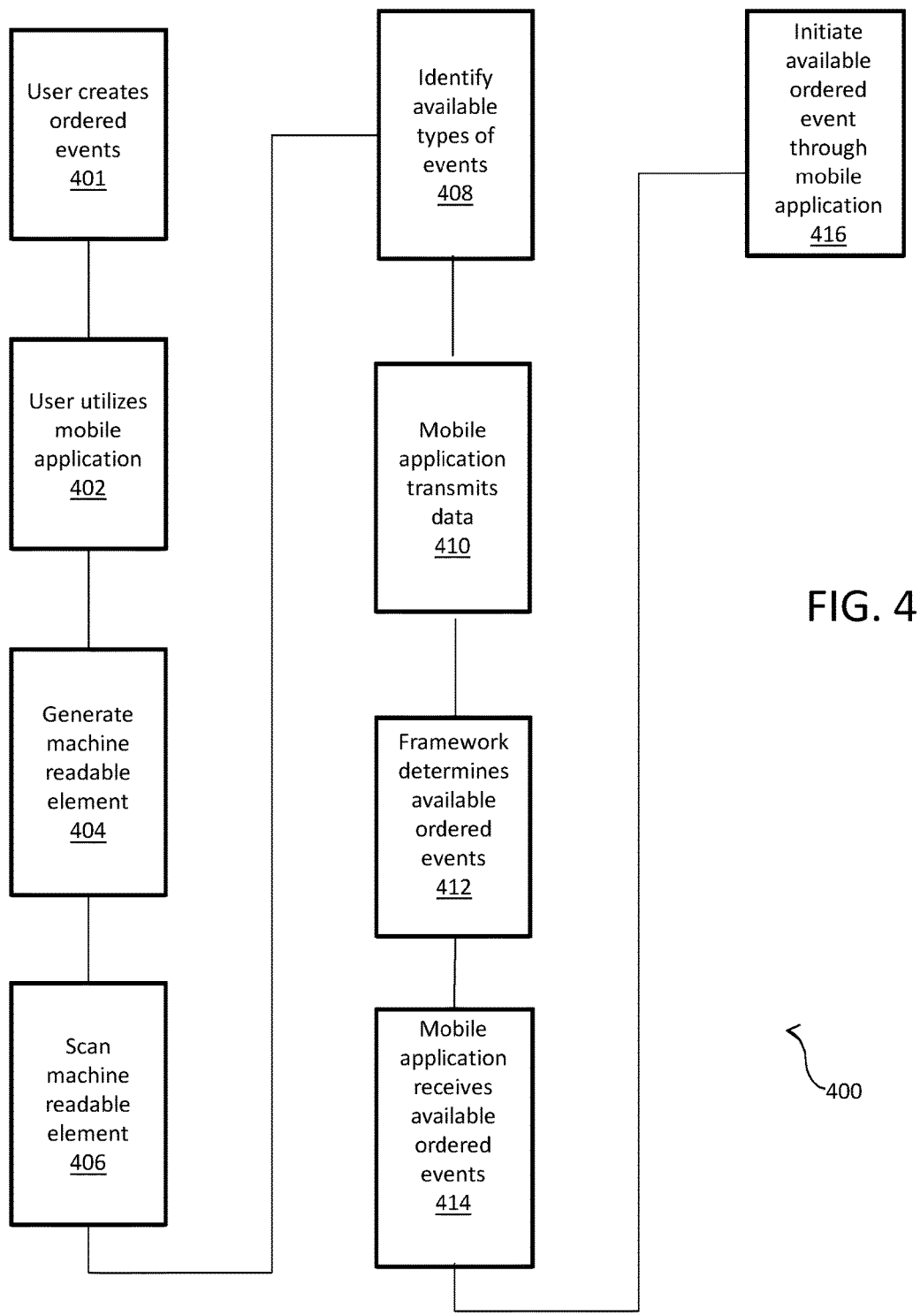
FIG. 4 illustrates a flowchart of an exemplary sequence for identifying one or more available location-based services using the location-based identification system, in accordance with an exemplary embodiment.

FIG. 4 illustrates an exemplary sequence 400 for location-based identification of available services in an exemplary embodiment. In operation 401, a user uses a computing device to create ordered services. It will be appreciated that the ordered services may also be created for the user by a third party. In operation 402, the user utilizes a specialized mobile application (e.g. mobile application 220 as shown in FIG. 2) on a mobile computing device (e.g. mobile computing device 200 as shown in FIG. 2) near a local computing device (e.g. local computing device 210 as shown in FIG. 2) in a physical facility (e.g. physical facility 212 as shown in FIG. 2). In operation 404, a MRE generator (e.g. MRE generator 202 as shown in FIG. 2) generates a machine-readable element (e.g. machine-readable element 100 as shown in FIG. 2) scannable by the mobile computing device. In an exemplary embodiment, the machine-readable element is displayed on or near a location of the local computing device. In operation 406, the mobile computing device scans the machine-readable element. In operation 408, the mobile application decodes identifiers in the machine-readable element to identify available types of services of the mobile application that are supported in that location. In an exemplary embodiment, at least one identifier provides information on the local computing device, such as a location identifier. In operation 410, the mobile application transmits data to the services management framework (e.g. services management framework 202 as shown in FIG. 2). The data includes the available types of services identified by the machine-readable element.

In operation 412, the services management framework maps the one or more ordered services to the available types of services to determine one or more available ordered services in the location. In operation 414, the services management framework transmits the one or more determined available ordered services to the mobile application. In operation 416, the mobile application initiates performance of the one or more available ordered services either through receiving a user selection or automatically.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a multiple system elements, device components or method steps, those elements, components or steps may be replaced with a single element, component or step. Likewise, a single element, component or step may be replaced with multiple elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

Portions or all of the embodiments of the present invention may be provided as one or more computer-readable programs or code embodied on or in one or more non-transitory mediums. The mediums may be, but are not limited to a hard disk, a compact disc, a digital versatile disc, ROM, PROM, EPROM, EEPROM, Flash memory, a RAM, or a magnetic tape. In general, the computer-readable programs or code may be implemented in any computing language.

We claim:

1. A system for identifying location-based services, the system comprising:
   a mobile application executable on a mobile computing device operated by a user;
   a database storing one or more previously ordered services associated with the user, wherein the one or more previously ordered services are pending services that are not yet complete due to the services requiring an interaction of the user with a physical facility;
   a machine-readable element generator associated with a local computing device and located within the physical facility, the machine-readable element generator configured to generate and display a machine-readable element that identifies types of services available to be performed at a location of the machine-readable element, wherein the one or more available types of services are location-based services capable of being performed at a location of the local computing device associated with the machine-readable element; and
   a server communicatively coupled to the database and the mobile application and hosting a services management framework configured to map the one or more previously ordered services to the one or more available types of services to determine one or more available previously ordered services at the location of the machine-readable element, wherein the one or more available previously ordered services are ordered services capable of being performed at the location of the local computing device associated with the machine-readable element,
   wherein the mobile application is configured to:
      scan and decode the machine-readable element, the machine-readable element providing the mobile application with an identity of the local computing device associated with the machine-readable element;
      identify the one or more available types of services based on the decoded machine readable element;
      transmit, to the services management framework, the identification of the one or more available types of services so that the services management framework determines one or more available previously ordered services at the location of the machine-readable element;
      receive, from the services management framework, an indication of the one or more available previously ordered services;
      receive a user selection to initiate performance of at least one of the one or more available previously ordered services; and
      communicate the selected one or more available previously ordered services, authentication information, and location identification information to the local computing device to initiate performance of the selected one or more available previously ordered services.

2. The system of claim 1, wherein the one or more available types of services includes at least one of purchasing goods and services, processing a pharmacy order, transferring money to a third party, receiving money from a third party, receiving an e-receipt from a purchase, and returning an item from the e-receipt.

3. The system of claim 1, wherein the machine-readable element is a QR code or a bar code.

4. The system of claim 1, wherein the mobile application is further configured to:
   display a query regarding the one or more available previously ordered services to the user; and
   receive, from the user, a selection of the at least one available previously ordered service referenced by the query.

5. The system of claim 1, wherein the mobile application is further configured to transmit to the services management framework at least one of user identification data, location data, and purchase data.

6. The system of claim 1, wherein the machine-readable element is displayed at a point of sale terminal or a kiosk.

7. The system of claim 1, wherein the machine-readable element generator generates a new machine-readable element after the machine-readable element is scanned.

8. A method for identifying location-based services, the method comprising:
   storing, in a database, one or more previously ordered services associated with a user, wherein the one or more previously ordered services are pending services that are not yet complete due to the services requiring an interaction of the user with a physical facility;
   generating, via a machine-readable element generator associated with a local computing device and located within the physical facility, a machine-readable element that identifies types of services available to be performed at a location of the machine-readable element, wherein the one or more available types of services are location-based services capable of being performed at a location of the local computing device associated with the machine-readable element;

displaying the machine-readable element at a predefined location, the machine-readable element decodable via a mobile application to identify the one or more available types of services and an identity of the local computing device associated with the machine-readable element;

receiving, from the mobile application, the identification of one or more available types of services at a server communicatively coupled to the database and the mobile application, the server hosting a services management framework;

mapping, via the services management framework, the one or more previously ordered services to the one or more available types of services to determine one or more available previously ordered services at the location of the machine-readable element, wherein the one or more available previously ordered services are ordered services capable of being performed at the location of the local computing device associated with the machine-readable element;

transmitting, from the services management framework, an indication of the one or more available previously ordered services to the mobile application; and communicating, from the mobile application, selected one or more available previously ordered services, authentication information, and location identification information to the local computing device to initiate performance of the selected one or more available previously ordered services, wherein performance of at least one available previously ordered service of the one or more available previously ordered services is initiated.

9. The method of claim 8, wherein the one or more available types of services includes at least one of purchasing goods and services, processing a pharmacy order, transferring money to a third party, receiving money from a third party, receiving an e-receipt from a purchase, and returning an item from the e-receipt.

10. The method of claim 8, wherein the machine-readable element is a QR code or a bar code.

11. The method of claim 8, wherein the services management framework is configured to receive at least one of user identification data, location data, and purchase data from the mobile application.

12. The method of claim 8, wherein the machine-readable element is displayed at a point of sale terminal or a kiosk.

13. The method of claim 8, wherein the machine-readable element generator generates a new machine-readable element after the machine-readable element is scanned.

14. At least one non-transitory computer-readable medium storing instructions for identifying location-based services that when executed:

stores, in a database, one or more previously ordered services associated with a user, wherein the one or more previously ordered services are pending services that are not yet complete due to the services requiring an interaction of the user with a physical facility;

generates, via a machine-readable element generator associated with a local computing device and located within the physical facility, a machine-readable element that identifies types of services available to be performed at a location of the machine-readable element, wherein the one or more available types of services are location-based services capable of being performed at a location of the local computing device associated with the machine-readable element;

displays, via a machine-readable element generator, the machine-readable element at a predefined location, the machine-readable element decodable via a mobile application to identify the one or more available types of services based on the decoded machine-readable element and an identity of the local computing device associated with the machine-readable element;

receives, from the mobile application, the identification of the one or more available types of services at a server communicatively coupled to the database and the mobile application, the server hosting a services management framework;

maps, via the services management framework, the one or more previously ordered services to the one or more available types of services to determine one or more available previously ordered services at the location of the machine-readable element, wherein the one or more available previously ordered services are ordered services capable of being performed at the location of the local computing device associated with the machine-readable element;

transmits, from the services management framework, an indication of the one or more available previously ordered services to the mobile application; and communicate, from the mobile application, selected one or more available previously ordered services, authentication information, and location identification information to the local computing device to initiate performance of the selected one or more available previously ordered services, wherein performance of at least one available previously ordered service of the one or more available previously ordered services is initiated.

15. The at least one non-transitory computer readable medium of claim 14, wherein the one or more available types of services includes at least one of purchasing goods and services, processing a pharmacy order, transferring money to a third party, receiving money from a third party, receiving an e-receipt from a purchase, and returning an item from the e-receipt.

16. The at least one non-transitory computer readable medium of claim 14, wherein the machine-readable element is a QR code or a bar code.

17. The at least one non-transitory computer readable medium of claim 14, wherein the services management framework is configured to receive at least one of user identification data, location data, and purchase data from the mobile application.

18. The at least one non-transitory computer readable medium of claim 14, wherein the machine-readable element is displayed at a point of sale terminal or a kiosk.

19. The at least one non-transitory computer readable medium of claim 14, wherein the machine-readable element generator generates a new machine-readable element after the machine-readable element is scanned.

* * * * *

(12) INTER PARTES REVIEW CERTIFICATE (3639th)

United States Patent
Nelms et al.

(10) Number: US 10,368,188 K1
(45) Certificate Issued: Jul. 5, 2024

(54) SYSTEMS AND METHODS FOR IDENTIFYING LOCATION-BASED SERVICES

(71) Applicants: David Martin Nelms; Eytan Daniyalzade; Bradley Joseph Kieffer

(72) Inventors: David Martin Nelms; Eytan Daniyalzade; Bradley Joseph Kieffer

(73) Assignee: WALMART APOLLO, LLC

Trial Number:

IPR2022-01509 filed Sep. 7, 2022

Inter Partes Review Certificate for:

Patent No.: 10,368,188
Issued: Jul. 30, 2019
Appl. No.: 15/834,747
Filed: Dec. 7, 2017

The results of IPR2022-01509 are reflected in this inter partes review certificate under 35 U.S.C. 318(b).

INTER PARTES REVIEW CERTIFICATE
U.S. Patent 10,368,188 K1
Trial No. IPR2022-01509
Certificate Issued Jul. 5, 2024

AS A RESULT OF THE INTER PARTES REVIEW PROCEEDING, IT HAS BEEN DETERMINED THAT:

Claims 1-19 are found patentable.

\* \* \* \* \*